(12) United States Patent
Yen (10) Patent No.: US 9,018,908 B2
(45) Date of Patent: Apr. 28, 2015

(54) RECHARGEABLE BATTERY MODULE AND BATTERY CHARGING METHOD

(71) Applicant: Via Technologies, Inc., New Taipei (TW)

(72) Inventor: Sheng-Hsien Yen, New Taipei (TW)

(73) Assignee: Via Technologies, Inc., New Taipei (TW)

( * ) Notice: Subject to any disclaimer, the term of this patent is extended or adjusted under 35 U.S.C. 154(b) by 328 days.

(21) Appl. No.: 13/744,942

(22) Filed: Jan. 18, 2013

(65) Prior Publication Data

US 2013/0187609 A1 Jul. 25, 2013

Related U.S. Application Data (60) Provisional application No. 61/588,812, filed on Jan. 20, 2012, provisional application No. 61/600,221, filed on Feb. 17, 2012.

(51) Int. Cl.
| | |
|---|---|
| *H02J 7/00* | (2006.01) |
| *H02J 7/04* | (2006.01) |
| *H02J 7/16* | (2006.01) |
| *H02J 7/06* | (2006.01) |

(52) U.S. Cl.
CPC .............. *H02J 7/007* (2013.01); *H02J 7/0016* (2013.01)

(58) Field of Classification Search
CPC ....... H02J 7/007; H02J 7/0072; H02J 7/0077; H02J 7/0047; H02J 2007/0049; H02J 2007/005; H02J 7/00; H02J 7/0013; H02J 7/0014; H02J 7/0019

USPC ......... 320/119, 125, 137, 152, 156, 158–159, 320/161–164
See application file for complete search history.

(56) References Cited

U.S. PATENT DOCUMENTS

| | | | | | |
|---|---|---|---|---|---|
| 5,861,730 | A | * | 1/1999 | Lee ................................ | 320/106 |
| 7,633,269 | B2 | * | 12/2009 | Chou et al. .................... | 320/162 |
| 8,299,755 | B2 | * | 10/2012 | Shiu et al. ..................... | 320/116 |
| 8,339,100 | B2 | * | 12/2012 | Li et al. ......................... | 320/118 |
| 8,427,105 | B2 | * | 4/2013 | Plett .............................. | 320/116 |
| 2005/0225305 | A1 | * | 10/2005 | Thrap .......................... | 323/234 |
| 2008/0218127 | A1 | * | 9/2008 | Kao et al. ...................... | 320/134 |
| 2009/0009133 | A1 | * | 1/2009 | Tange et al. ................... | 320/132 |
| 2011/0226559 | A1 | * | 9/2011 | Chen et al. .................... | 187/290 |
| 2011/0241622 | A1 | * | 10/2011 | Li et al. ......................... | 320/116 |
| 2012/0194137 | A1 | * | 8/2012 | Wang ............................ | 320/119 |
| 2013/0099723 | A1 | * | 4/2013 | Li et al. ......................... | 320/103 |

\* cited by examiner

*Primary Examiner* — Stacy Whitmore (74) *Attorney, Agent, or Firm* — McClure, Qualey & Rodack, LLP (57) ABSTRACT

An embodiment of the invention provides a rechargeable battery module including a battery bank having serial connected battery units, a charging transistor providing a charging current to the battery bank, a balancing circuit for detecting and balancing voltage values of battery units and battery bank and a control chip. When a first voltage value of a first battery unit reaches a charge-off voltage, the control chip estimates a first unbalanced voltage difference between the first voltage and the minimal voltage among battery units. The control chip disables the charging transistor and estimates a second unbalanced voltage difference between voltages of the first battery unit and the battery unit having a minimal voltage. The control chip enables the balancing circuit to balance the first battery unit. When the voltage of the first battery is dropped by a calibration target, the charging transistor is enabled.

14 Claims, 6 Drawing Sheets

RECHARGEABLE BATTERY MODULE AND BATTERY CHARGING METHOD

CROSS REFERENCE TO RELATED APPLICATIONS

This application claims the benefit of U.S. Provisional Application No. 61/588,812 filed Jan. 20, 2012, and U.S. Provisional Application No. 61/600,221 filed Feb. 17, 2012, the entirety of which is incorporated by reference herein.

BACKGROUND OF THE INVENTION

1. Field of the Invention

The present invention relates to a rechargeable battery module and a battery charging method.

2. Description of the Related Art

A lithium battery is small-sized, light weight and rechargeable. Lithium batteries are often packaged in series as a rechargeable battery module used in electronic devices.

However, an over charged lithium battery may produce gas, and there is a risk of explosion. Thus, the voltage of every battery cell of a rechargeable battery module has to be monitored. A charging procedure performed on a series of the battery cells has to be stopped once the voltage of any battery cell reaches an overcharge voltage threshold. The charge capacity of the entire rechargeable battery module, therefore, is seriously reduced.

A conventional battery balancing procedure, generally, is performed when the rechargeable battery module is charged in a constant current mode (CC mode). Considering the constant charging current, a voltage measured between the two ends of a battery cell includes a voltage drop I*R generated by the internal resistance of the battery cell. After a period of time of use, aging of each the battery cells may be different, which result in unequal internal resistances. Different battery cells may have different voltage drop I*R during battery balancing procedure. Thus, it is difficult to make a real balance between the different battery cells by conventional battery balancing techniques.

BRIEF SUMMARY OF THE INVENTION

A rechargeable battery module and a battery charging method for a rechargeable battery model are disclosed.

A rechargeable battery module in accordance with an exemplary embodiment of the invention comprises a battery bank having a plurality of the battery units connected in series, a charging transistor, a balancing circuit and a control chip. The charging transistor charges the battery bank by a charging current. The balancing circuit is coupled to the battery bank to detect and to balance voltage values of the battery cells and the battery bank. The control chip receives voltage values of the battery bank and each battery unit of the battery bank. When a first voltage value of a first battery unit among the battery units reaches a charge-off voltage, the control chip estimates a first unbalanced voltage difference and then disables the charging transistor to stop providing the charging current. When the charging transistor is disabled, the control chip estimates a second unbalanced voltage difference, and then enables the balance circuit to balance the voltage value of the first battery unit. When the voltage value of the first battery unit is balanced for a calibration target, the control chip enables the charging transistor. The first unbalanced voltage difference is between the first voltage value and a first minimum voltage value among the voltage values of the battery units before the charging transistor is disabled. The second unbalanced voltage difference is between a second voltage value of the first battery unit and a second minimum voltage value among the voltage values of the battery units after the charging transistor is disabled. The calibration target relates to the first unbalanced voltage difference and the second unbalanced voltage difference.

Another embodiment of the invention provides a battery charging method for a battery bank having serial connected battery units. The method comprises the steps of: charging the battery bank with a charging current; detecting voltages of each battery units; when a first voltage of a first battery unit among the battery units reaches a charge-off voltage, estimating a first unbalanced voltage difference; stopping providing the charging current; estimating a second unbalanced voltage difference; and balancing the voltage of the first battery unit and providing the charging current again when the voltage value of the first battery unit is balanced for a calibration target. The first unbalanced voltage difference is between the first voltage value and a first minimum voltage value among the voltage values of the battery units before the charging transistor is disabled. The second unbalanced voltage difference is between a second voltage value of the first battery unit and a second minimum voltage value among the voltage values of the battery units after the charging transistor is disabled. The calibration target relates to the first unbalanced voltage difference and the second unbalanced voltage difference.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

Figure 1:
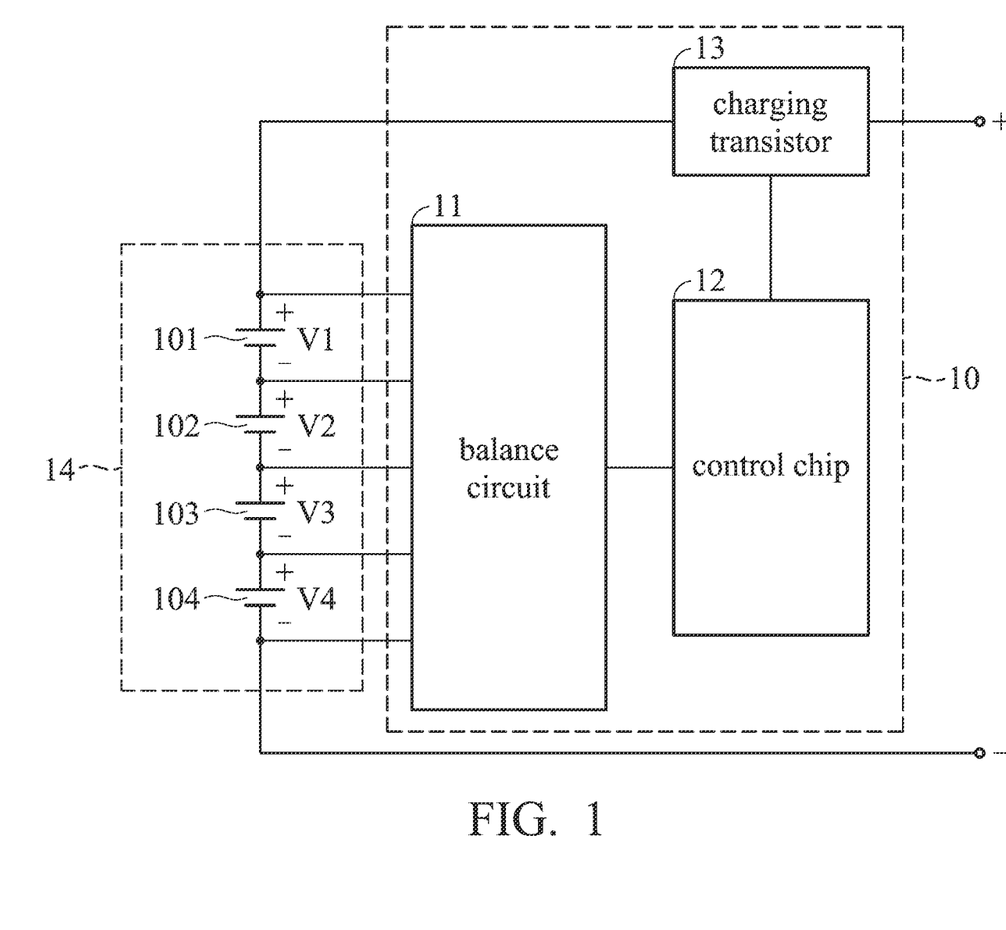
FIG. 1 is a schematic diagram of an embodiment of a battery charging system according to the invention.

FIG. 1 is a schematic diagram of an embodiment of a battery charging system according to the invention. The charging system comprises a charging transistor 13, a control chip 12, a balance circuit 11 and a battery bank 14. The battery bank 14 comprises serial connected battery units 101-104. The balance circuit 11 is coupled to the battery units 101-104 to detect and to balance voltage values of the battery bank 14 and battery units 101-104. The control chip 12 controls the charging transistor 13 to adjust a charging current of the battery bank 14 according to the detected voltage values by the balance circuit 11. In one embodiment, the balance circuit 11, controlled by the control chip 12, further balances each voltage values of the battery units 101-104. In this embodiment, the charging transistor 13, the control chip 12 and the balance circuit 11 can be regarded as a charging module 10.

Generally speaking, when the battery bank 14 is charged for several times, the battery units 101-104 may age. However, the degree of aging of each battery unit of the battery bank 14 may be different. For example, when the battery bank 14 is charged, the voltage value V of the battery unit 101 can be represented:

$$V=Voc+IR_1,$$

wherein I is the charging current, $R_1$ is an internal resistance, and Voc is an open circuit voltage of the battery unit 101.

When the degree of aging increases, the internal resistance of the battery unit also increases. If the internal resistance is too large, the voltage value V measured during charging may be larger than an over-charging voltage and then the charging transistor 13 stops charging the battery bank 14. However, the battery units of the batter bank 14 may not really be full-charged, i.e. the battery bank 14 is not really full-charged, and the battery bank 14 may be switched between two states, charging and stop-charging, which damages the battery units. Thus, a balance circuit is required for balancing the open circuit voltage of the battery unit having large internal resistance.

The control chip 12 receives the voltage values of the battery bank 14 and battery units 101-104 transmitted from the balance circuit 11. The control chip determines whether to disable the charging transistor 13 to stop providing current and execute a voltage balance procedure according to the received voltage values. In one embodiment, the battery unit 101 has the maximum voltage value and the battery unit 102 has the minimum voltage value during the charging procedure. When the voltage value of the battery unit 101 reaches a charge-off voltage value, the control chip 12 recodes the voltage value V1 of the battery unit 101 and voltage value V2 of the battery unit 102 at that time. The control chip may estimate a first unbalanced voltage difference $V_{d1}$ according to the voltage values V1 and V2, wherein $V_{d1}$=V1−V2. The voltage values V1 and V2 can be expressed as follows:

$$V1=V_{oc1}+IR_1$$

$$V2=V_{oc2}+IR_2,$$

wherein $R_1$ and $R_2$ are internal resistances of the battery units 101 and 102 respectively, and $V_{oc1}$ and $V_{oc2}$ are voltage values of the open circuit voltage of the battery units 101 and 102, respectively.

Then, the control chip 12 disables the charging transistor 13 to stop providing the charging current to the battery bank 14. The control chip 12 recodes the voltage value V1' of the battery unit 101 and voltage value V2' of the battery unit 102 at that time. The voltage values V1' and V2' can be expressed as follows:

$$V1'=V_{oc1}$$

$$V2'=V_{oc2}$$

The control chip 12 then estimates a second unbalanced voltage difference $V_{d2}$ according to the voltage values V1' and V2', wherein $V_{d2}$=V1'−V2'. The control chip 12 estimates a calibration target according to the first unbalanced voltage difference $V_{d1}$ and the second unbalanced voltage difference $V_{d2}$. The calibration target relates to the first unbalanced voltage difference (V1−V2) and the second unbalanced voltage difference (V1'−V2'). In other words, the calibration target relates to the voltage differences before the charging transistor 13 is disabled (with charging current) and after the charging transistor 13 is disabled (without charging current). In one embodiment, the calibration target can be calculated by the following equation:

$$V_{cal}=(V_{d1}-V_{d2})*X+V_{d2},$$

wherein $V_{cal}$ is the calibration target, $V_{d1}$ is the first unbalanced voltage difference, $V_{d2}$ is the second unbalanced voltage difference, and X is a ratio.

In one embodiment, X is the value between 1 and 0 and preferred to be between 0.5 and 1. This embodiment illustrates X with the value of 0.5.

When the first unbalanced voltage difference $V_{d1}$ is larger than a balance threshold, the control chip 12 enables the balance circuit 11 to balance the voltage value of the battery unit 101. The voltage value of the battery unit 101 is pulled down from $V_1'$ to $(V_1'-V_{cal})$. It is noted that the charging transistor 13 has been disabled because the voltage value of the battery unit 101 reached a charge-off voltage value. When the voltage of the battery unit 101 drops to $(V_1'-V_{cal})$, the control chip enables the charging transistor 13 to provide the charging current again and disables the balance circuit 11.

In this embodiment, the charging transistor 13 works in a constant current mode (CC mode) when started. This means that the battery bank 14 is charged by a constant current. When the voltage value of any one of the battery units 101-104 reaches the charge-off voltage value and the first unbalanced voltage difference (V1−V2) is larger than a balance threshold, the charging transistor 13 is disabled and the balance circuit 11 is enabled to balance the voltage value of the battery unit. When the voltage value is balanced, the control chip 12 determines whether a state of the battery bank 14 meets a charging mode switch condition. If yes, the control chip 12 controls the charging transistor 13 to work at a constant voltage mode (CV mode) to charge the battery bank 14. If not, the charging transistor 13 still works in the constant current mode. In one embodiment, when the total output voltage value of the battery bank 13 is a full-charged voltage value, the control chip 12 determines that the state of the battery bank 14 meets the charging mode switch condition. It is noted that the voltage difference between any two of the battery units 101-104 is small after the voltage balance procedure. When the battery bank 14 is charged by a constant voltage, the voltage value (V=Voc+IR) of each battery unit is substantially the same.

In summary, the charging module calculates the calibration target according to the voltage difference between any two of the battery units 101-104 with the charging current and the voltage difference between any two of the battery units 101-104 without the charging current. Thus, the effect of the internal resistance of battery cell is taken into account. After considering the influence of the internal resistance, the voltage value of any one of the battery units will not reach the charge-off voltage value too soon when the battery bank 14 is re-charged. Furthermore, when the battery bank is charged by a constant voltage, the voltage value of each battery unit (V=Voc+IR) is substantially the same.

Figure 2:
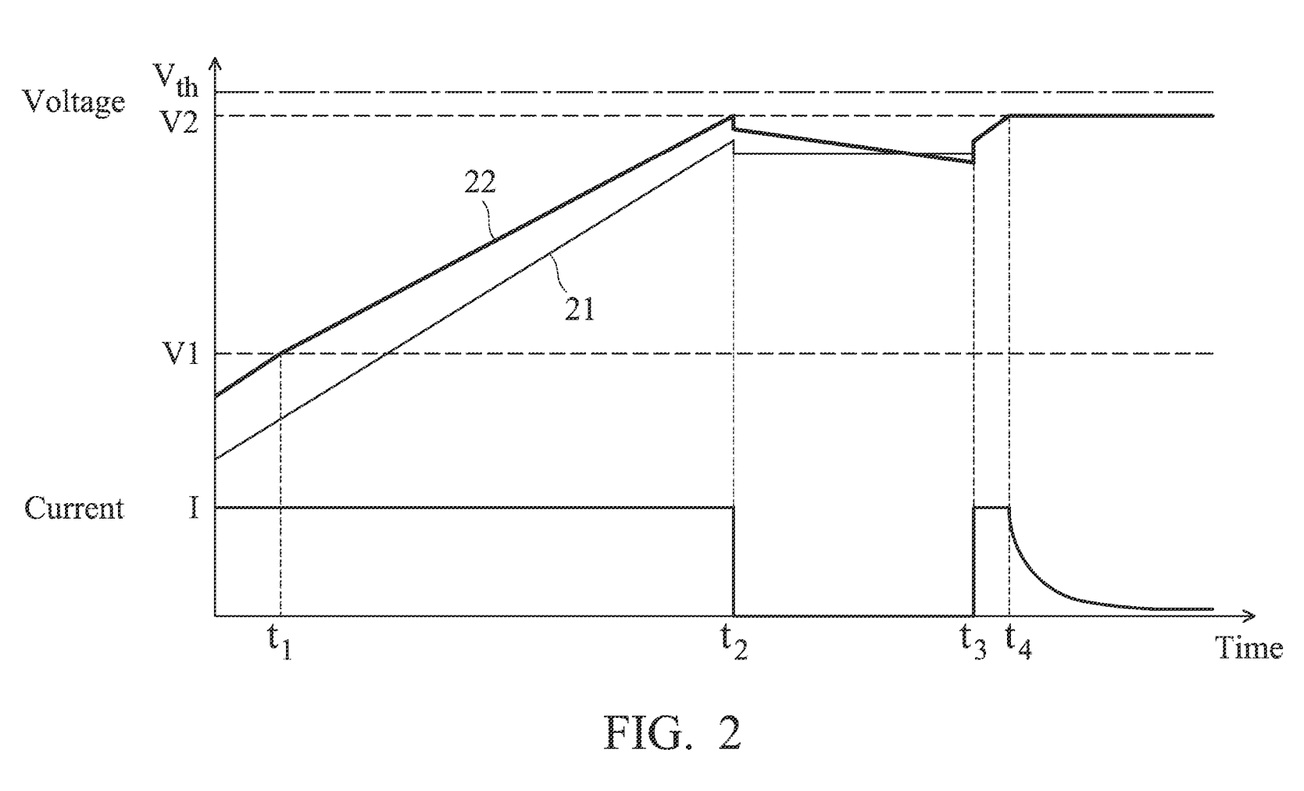
FIG. 2 is a schematic diagram of a charging curve of one battery bank according to one embodiment of the invention.

FIG. 2 is a schematic diagram of a charging curve of one battery bank according to one embodiment of the invention. The embodiment of FIG. 2 is illustrated with two battery units, but the invention is not limited thereto. The charging curve 21 is the charging curve of a second battery unit of the battery bank and the charging curve 22 is the charging curve of a first battery unit of the battery bank. In this embodiment, the first battery unit can be analogous to the battery unit 101 of FIG. 1 and the second battery unit can be analogous to the battery unit 102 of FIG. 1.

When the battery bank 14 is charged, the charging module 10 charges the battery 14 with a constant current I. When the voltage value of the first battery unit reaches V1, the balance circuit is enabled. In another embodiment, the charging module 10 may detect a voltage difference between the voltage value of the first battery unit and the voltage value of the second battery unit, and when the voltage difference is larger than a balance threshold, the balance circuit is enabled.

When the balance circuit is enabled, the balance circuit of the charging module 10 controls a first charging rate of the first battery unit. The first charging rate is adjusted to be less than a second charging rate of the second battery. Referring to FIG. 2, the slope rate of curve 21 is smaller than the slope rate of curve 22 between time t1 and time t2.

At time t2. The voltage value of the first battery unit reaches a charge-off voltage V2, and the charging module 10 disables the charging transistor 13 to stop charging battery bank 14. Due to the internal resistance of each battery unit, the voltage values of the first battery unit and the second battery unit decrease. The voltage drop of the first battery unit or the second battery unit is IR, wherein I is the charging current and R is the internal resistance of the first or second battery unit. Therefore, at time t2, the voltage difference between the first battery unit and the second battery unit before the charging transistor 13 is disabled is different from the voltage difference between the first battery unit and the second battery unit after the charging transistor 13 is disabled. Then, a first unbalanced voltage difference between the first battery unit and the second battery unit before the charging transistor 13 is disabled is estimated, and a second unbalanced voltage difference between the first battery unit and the second battery unit after the charging transistor 13 is disabled is estimated.

In one embodiment, the voltage drop of the first battery unit is larger than the voltage drop of the second battery unit.

After the charging module stops charging the battery bank 14, a calibration target of the first battery unit is estimated. Reference may be made to the above paragraphs for the calculation of the calibration, and thus, will not be discussed here for brevity. The balance circuit 11 first pulls down the voltage value of the first battery unit and the charging module 10 charges the battery 14 again at time t3. The voltage difference between the voltage of the first battery unit at time t2 and the voltage of the first battery unit at time t3 is equal to the calibration target. In other words, the voltage value balanced by the balance circuit 11 during the time t2 to time t3 is the calibration target.

At time t4, the voltages of the first battery unit and the second battery unit is substantially equal to the charge-off voltage V2, and the charging module 10 charges the battery bank by a constant voltage. Since the open circuit voltages of the first battery unit and the second battery unit increase and the total voltage value of the battery bank 14 is constant during constant-voltage charging, the voltage caused by the internal resistance of the battery unit is decreased and therefore the charging current is decreased.

In this embodiment, to avoid over-charging, an over-charging protection voltage Vth is determined and the voltage value of each battery unit cannot exceed the voltage Vth. The described charging-off voltage V2 is smaller than the voltage Vth.

Figure 3:
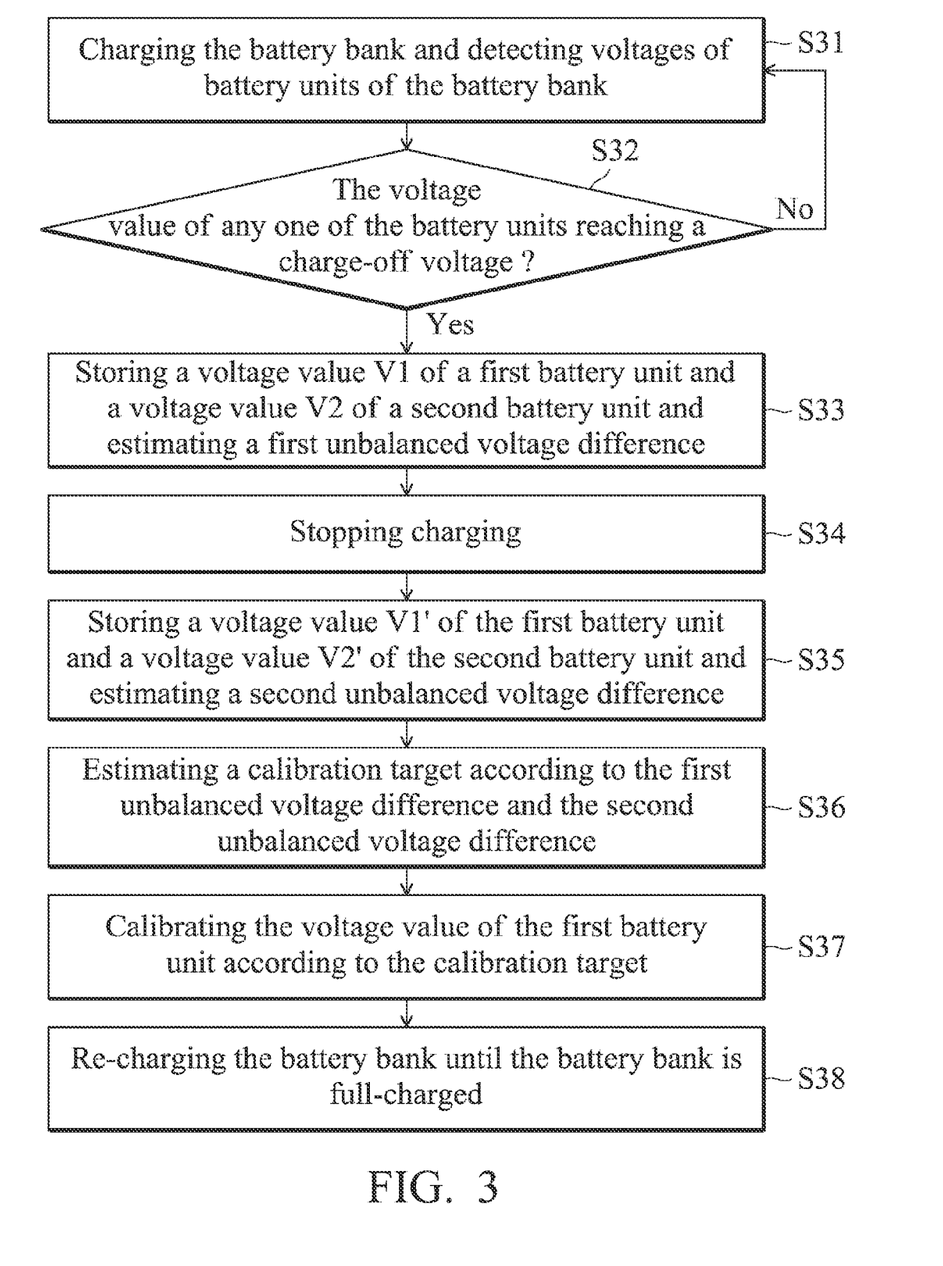
FIG. 3 is a flow chart of an embodiment of the charging method for a battery bank according to the invention.

FIG. 3 is a flow chart of an embodiment of the charging method for a battery bank according to the invention. The charging method can be applied to a charger, charging device or the battery with a charging module. The charger, charging device or charging module detects the voltage of each battery unit of the battery bank and a total voltage of the battery bank. The embodiment is illustrated with a battery with a charging module. Referring to FIG. 1, the control chip 12 can be implemented by hardware, software or the combination thereof. In one embodiment, the control chip 12 is implemented by a processor executing firmware to execute the charging method of FIG. 3. The firmware is stored in the ROM of the control chip 12.

In the step S31, the charging module 10 charges the battery bank and detects voltage values of each battery unit of the battery bank. In step S32, the charging module determines whether the voltage value of any battery unit is larger than a charge-off voltage or a threshold voltage. In this embodiment, to avoid over-charging, an over-charging protection voltage is determined and the voltage value of each battery unit cannot exceed the over-charging protection voltage. The described charging-off voltage is smaller than the over-charging protection voltage. The voltage balance procedure of the battery units of the battery bank is executed based on the charging-off voltage.

If the voltage values of the battery units of the battery bank are smaller than the charging-off voltage, step S31 is executed and the charging module 10 continues to charge the battery bank. If the voltage value of any battery unit is larger than the charging-off voltage, step S33 is executed. In this embodiment, a first battery unit of the battery bank has the maximum voltage value V1 and a second battery unit of the battery bank has the minimum voltage value V2. The charging module 10 recodes the voltage value V1 of the battery unit and voltage value V2 of the battery unit at that time. And then the charging module 10 estimates a first unbalanced voltage difference $V_{d1}$ according to the voltages V1 and V2, wherein $V_{d1}=V1-V2$.

In the step S34, the charging module 10 stops charging the battery bank 14. Referring to FIG. 1, the control chip 12 disables the charging transistor 13. During charging, the measured voltage value V comprises a voltage drop IR. Therefore, when stopping the charge of the battery bank 14, the voltage values of the battery units decrease. The charging module 10 recodes the voltage value V1' of the first battery unit and voltage value V2' of second battery unit at that time. The control chip 12 then estimates a second unbalanced voltage difference $V_{d2}$ according to the voltages V1' and V2', wherein $V_{d2}=V1'-V2'$.

In the step S36, the charging module estimates a calibration target according to the first unbalanced voltage difference $V_{d1}$ and the second unbalanced voltage difference $V_{d2}$. In one embodiment, the calibration target can be calculated by the following equation:

$$V_{cal}=(V_{d1}-V_{d2})*X+V_{d2},$$

wherein $V_{cal}$ is the calibration target, $V_{d1}$ is the first unbalanced voltage difference, $V_{d2}$ is the second unbalanced voltage difference, and X is a ratio.

In one embodiment, X is the value between 1 and 0 and preferred to be between 0.5 and 1. This embodiment illustrates X with the value of 0.5.

In the step S37, the charging module 10 calibrates the voltage value of the first battery unit according to the calibration target. When the voltage value of the first battery unit is pulled down from $V_1'$ to $(V_1'-V_{cal})$, step S38 is executed. In step S38, the charging module 10 re-charges the battery bank. Referring to FIG. 1, the control chip 12 enables the charging transistor 13 until the battery is fully charged. It is noted that the charging module 10 may repeat steps S31-S37 to charge the battery bank and balance the voltage of the battery bank in step S38.

Figure 4:
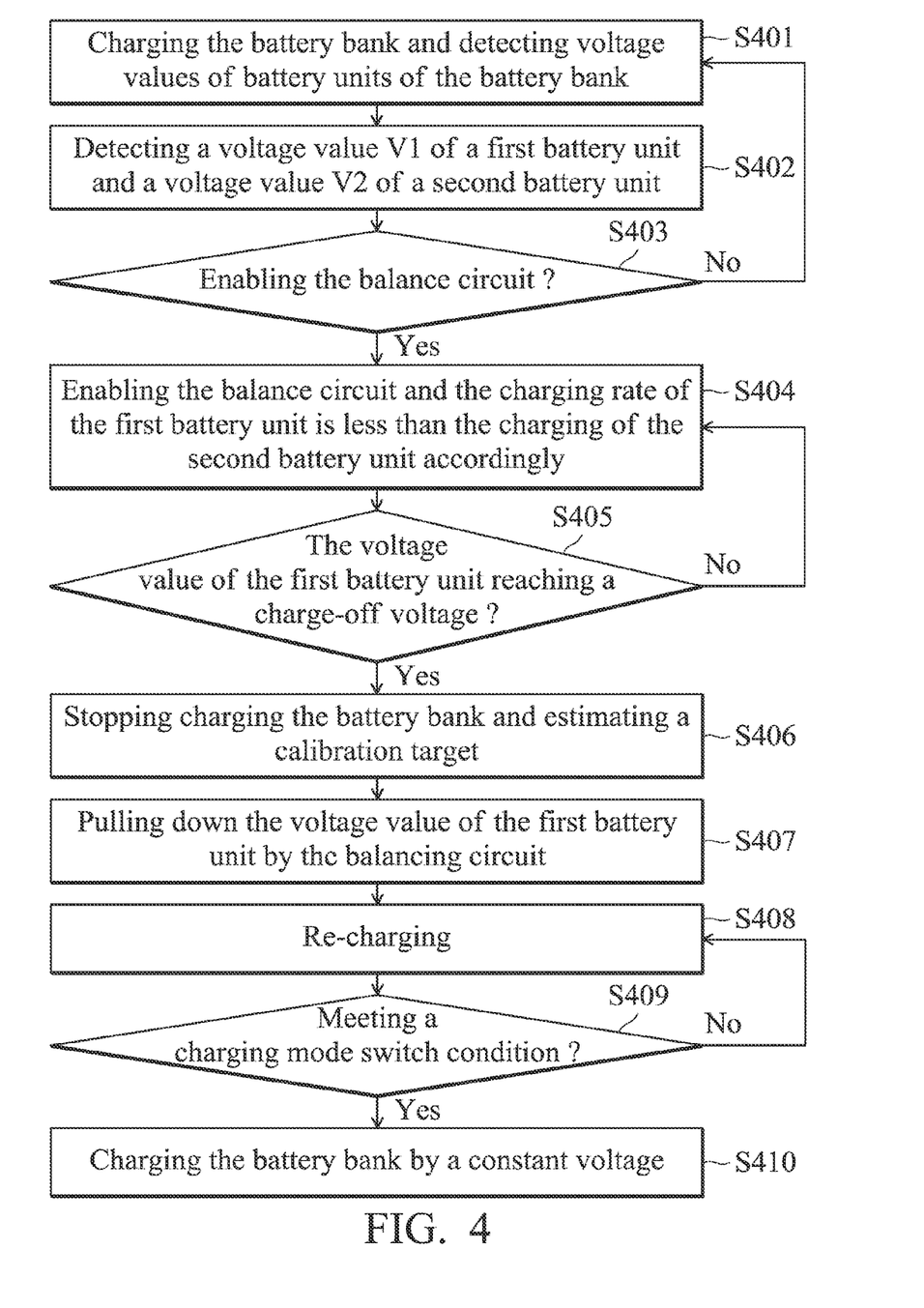
FIG. 4 is a flow chart of another embodiment of the charging method for a battery bank according to the invention.

FIG. 4 is a flow chart of another embodiment of the charging method for a battery bank according to the invention. The charging method can be applied to a charger, charging device or the battery with a charging module. The charger, charging device or charging module detects the voltage of each battery unit of the battery bank and a total voltage of the battery bank. The embodiment is illustrated with a battery with a charging module. Referring to FIG. 1, the control chip 12 can be implemented by hardware, software or the combination thereof. In one embodiment, the control chip 12 is implemented by a processor executing firmware to execute the charging method of FIG. 3. The firmware is stored in the ROM of the control chip 12.

In the step S401, the charging module 10 charges the battery bank and detects voltage values of each battery unit of the battery bank. In the step S402, the charging module 10 detects a voltage value V1 of a first battery unit and a voltage value V2 of a second battery unit. The first battery unit of the battery bank has the maximum voltage value V1 and the second battery unit of the battery bank has the minimum voltage value V2.

In the step S403, the charging module 10 determines whether the voltage values V1 and V2 meet an activation condition of a balance circuit. In this embodiment, the activation condition of the balance circuit has two possible conditions. In the first possible condition, if the voltage value V1 of the first battery unit reaches a charge-off voltage, the balance circuit is enabled. In the second possible condition, when a voltage difference between voltage values V1 and V2 is larger than a balance threshold, the balance circuit is enabled. The embodiment of FIG. 4 is illustrated with the second possible condition. In another embodiment, a predetermined voltage value can be preset and when the voltage value V1 of the first battery unit reaches the predetermined voltage value, the balance circuit is enabled. The predetermined voltage value is smaller than the charge-off voltage and the over-charging protection voltage of the battery unit. In another embodiment, each battery unit has a corresponding balance circuit, and when the voltage value V1 of the first battery unit reaches the charge-off voltage, the balance circuit corresponding to the first battery unit is enabled. If the voltage difference between voltage values V1 and V2 is larger than the balance threshold, the balance circuit corresponding to the first battery unit is enabled.

If the voltage values V1 and V2 do not meet the activation condition of the balance circuit, step S401 is executed, and the charging module 10 charges the battery bank in the constant current mode. If the voltage values V1 and V2 meet the activation condition of the balance circuit, step S404 is executed, and the balance circuit controls a first charging rate of the first battery unit to be less than a second charging rate of the second battery accordingly.

In the step S405, the charging module 10 determines whether the voltage of the first battery unit reaches a charge-off voltage. If not, the step S404 is executed. If yes, the step S406 is executed to stop charging the battery bank. The charging module 10 recodes the voltage value V1 of the first battery unit and voltage value V2 of second battery unit before the first battery unit and the second battery is stopped charging. And the charging module 10 recodes the voltage value V1' of the first battery unit and voltage value V2' of second battery unit after the first battery unit and the second battery is stopped charging. Then, the charging module 10 estimates a calibration target for the first battery unit and the voltage value of the first battery unit is pulled down by the balance circuit 11. The calibration target relates to (V1−V2) and (V1'−V2'). In one embodiment, the calibration target can be expressed as follows:

$$V_{cal}=(V_{d1}-V_{d2})*X+V_{d2},$$

wherein $V_{cal}$ is the calibration target, $V_{d1}$ is the first unbalanced voltage difference, $V_{d2}$ is the second unbalanced voltage difference, and X is a ratio.

In one embodiment, X is the value between 1 and 0 and preferred to be between 0.5 and 1. This embodiment illustrates X with the value of 0.5.

In the step S408, the charging module 10 re-charges the battery bank. In the step S409, the charging module 10 determines whether a state of the battery bank meets a charging mode switch condition. If not, the step S408 is executed. If yes, the step S410 is executed, and the charging module 10 charges the battery bank by a constant voltage. In one embodiment, when the voltage value of the battery bank 14 is a fully charged voltage value, the charging module 10 determines that the state of the battery bank 14 meets the charging mode switch condition.

Figure 5:
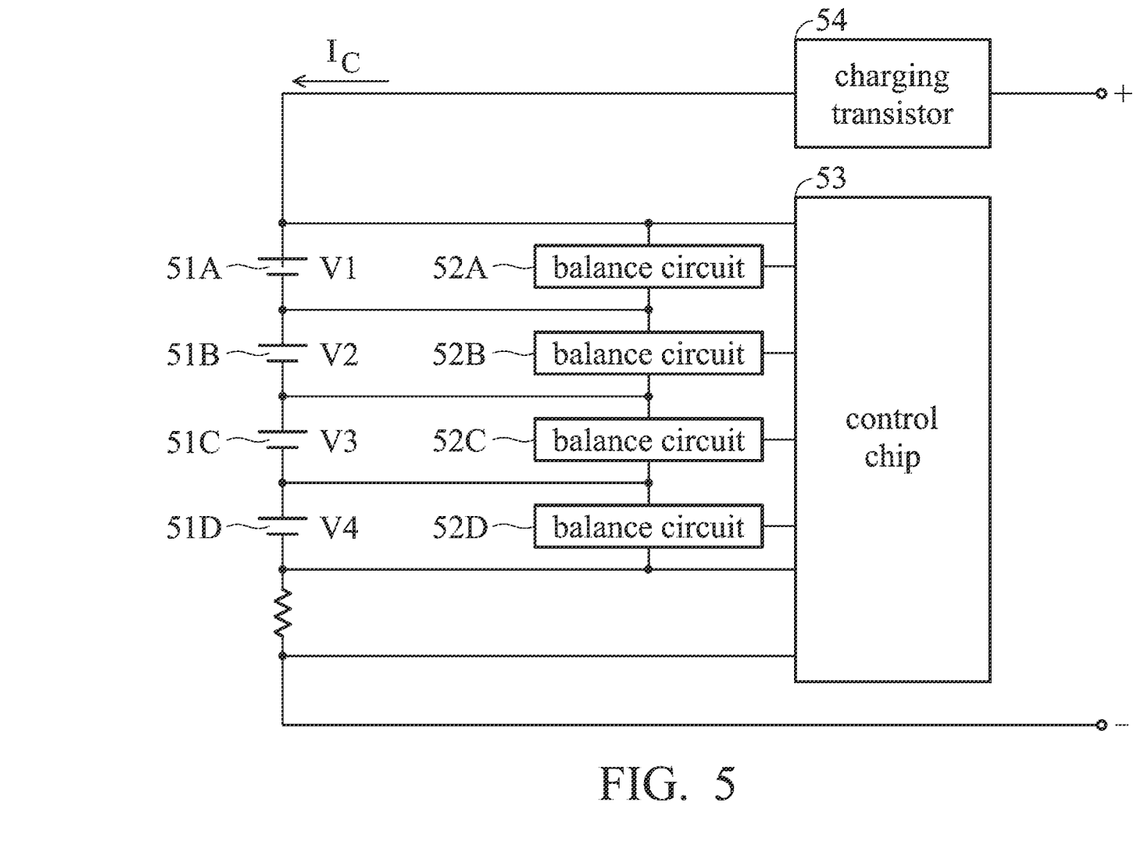
FIG. 5 is a schematic diagram of another embodiment of a battery charging system according to the invention.

FIG. 5 is a schematic diagram of another embodiment of a battery charging system according to the invention. Compared with the system of FIG. 1, the difference is that the embodiment of FIG. 5 comprises balance circuits 52A-52D coupled to corresponding battery units 51A-51D respectively to detect the voltage values of the battery units 51A-51D. The operations of other elements are similar to corresponding elements in FIG. 1 and not be discussed here for briefly.

Figure 6:
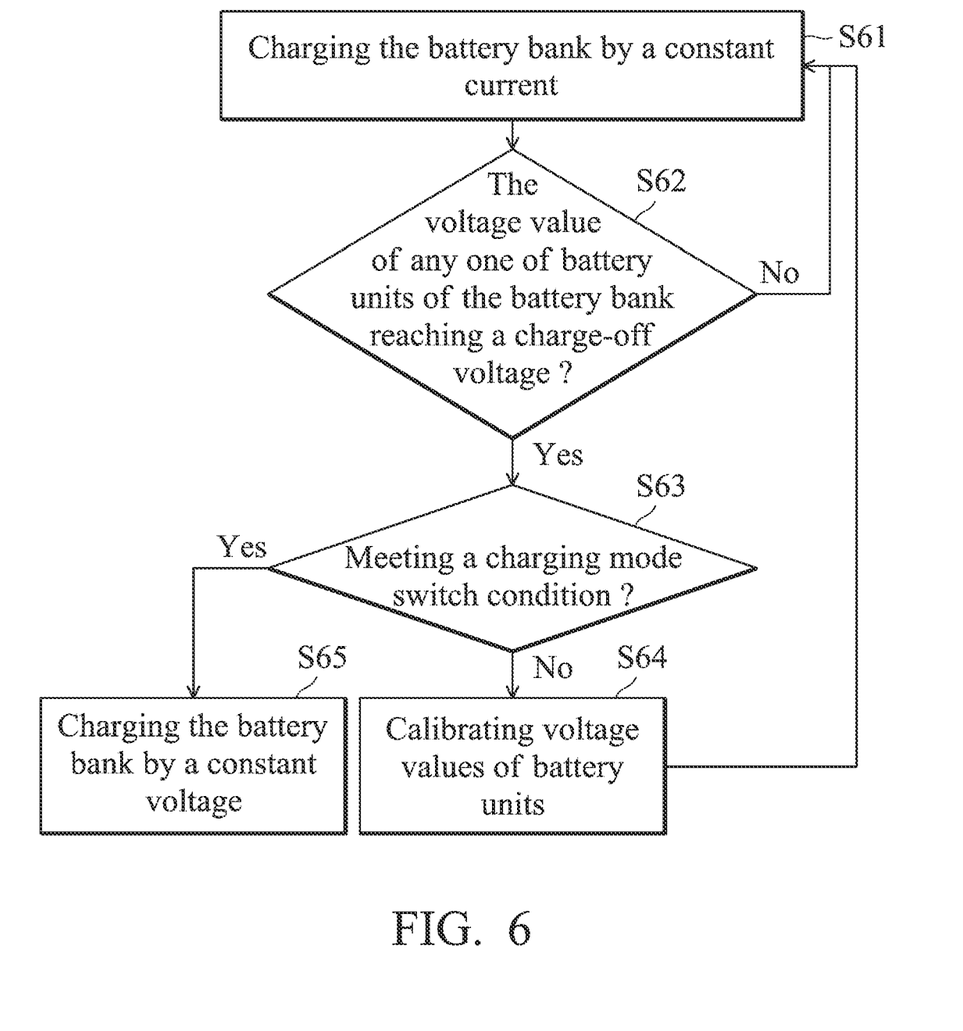
FIG. 6 is a flow chart of another embodiment of the charging method for a battery bank according to the invention.

FIG. 6 is a flow chart of another embodiment of the charging method for a battery bank according to the invention. The charging method can be applied to a charger, charging device or the battery with a charging module. The charger, charging device or charging module detects the voltage of each battery unit of the battery bank and a total voltage of the battery bank. The embodiment is illustrated with a battery with a charging module. Referring to FIG. 1, the control chip 12 can be implemented by hardware, software or the combination thereof. In one embodiment, the control chip 12 is implemented by a processor executing firmware to execute the charging method of FIG. 3. The firmware is stored in the ROM of the control chip 12.

In the step S61, the charging module charges the battery bank by a constant current. In the step S62, the charging module monitors the voltage values of the battery units of the battery bank and determines whether the voltage value of any battery unit has reached a charge-off voltage. If not, the step S61 is executed. If yes, step S63 is executed. In the step S63, the charging module determines whether a state of the battery bank meets a charging mode switch condition. If yes, the step S65 is executed, and the charging module charges the battery bank by a constant voltage. If not, step S64 is executed. In step S64, the charging module balances and calibrates voltages of the battery units of the battery bank. Reference can be made to corresponding steps in FIG. 3 and FIG. 4 for the details of step S64.

The charging mode switch condition in step S63 is different from the charging mode switch condition in step S409 in FIG. 4. In step S409, the charging mode switch condition is that the voltage value of the battery bank 14 is a fully charged voltage value. But in step S63, the charging mode switch condition is that the voltage value of the battery bank 14 reaches a predetermined voltage (not the fully charged voltage value in step S409), and a voltage difference between a maximum voltage value and a minimum voltage value among the battery units is larger than a balance threshold. When the total voltage value of the battery bank 14 reaches the predetermined voltage, and the voltage difference between a maximum voltage value and a minimum voltage value among the battery units is larger than a balance threshold, the charging module determines the state of the battery bank meets a charging mode switch condition in the step S63. Assuming the battery bank comprises four serial connected battery units and the charge-off voltage of each battery unit is set to be 2.9V (the fully charged voltage value is 11.6V). The balance threshold is 0.1V and the predetermined voltage is set to 11.2V. When the voltage value of any battery unit reaches 2.8V (yes at step S62), the charging module detects voltage values of other battery units. Assuming the voltage values of other battery units are 2.85V, 2.87V and 2.88V, the voltage difference between the maximum voltage value and the minimum voltage value is 0.05V, and the voltage value of the battery bank 14 is 11.5V (yes at step S63), the charging module determines that the state of the battery bank meets the charging mode switch condition. Then, the charging module charges the battery bank by a constant voltage.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A rechargeable battery module, comprising:
a battery bank having serial connected battery units;
a charging transistor providing a charging current to the battery bank;
a balance circuit coupled to the battery to detect and to balance voltage values of the battery units and the battery bank; and
a control chip receiving the voltage values of the battery bank and the battery units, when a first voltage value of a first battery unit among the battery units reaches a charge-off voltage value, the control chip estimating a first unbalanced voltage difference and then disabling the charging transistor to stop providing the charging current,
wherein when the charging transistor is disabled, the control chip estimates a second unbalanced voltage difference, and then enables the balance circuit to balance the voltage value of the first battery unit, and when the voltage value of the first battery unit is balanced for a calibration target, the control chip enables the charging transistor,
wherein the first unbalanced voltage difference is between the first voltage value and a first minimum voltage value among the voltage values of the battery units before the charging transistor is disabled, and wherein the second unbalanced voltage difference is between a second voltage value of the first battery unit and a second minimum voltage value among the voltage values of the battery units after the charging transistor is disabled, and the calibration target relates to the first unbalanced voltage difference and the second unbalanced voltage difference.

2. The module as claimed in claim 1, wherein when the first unbalanced voltage difference exceeds a balance threshold, the control chip enables the balance circuit to balance the voltage value of the first battery unit.

3. The module as claimed in claim 1, wherein the control chip calculates a voltage difference between the first unbalanced voltage difference and the second unbalanced voltage difference, and the calibration target is a sum of the second unbalanced voltage difference and a product of the voltage difference and a ratio, wherein the ratio is less than 1.

4. The module as claimed in claim 3, wherein the ratio is 0.5.

5. The module as claimed in claim 1, wherein when the charging transistor is enabled, the control chip determines whether a state of the battery bank meets a charging mode switch condition, and the battery bank is charged by a constant voltage charging mode when the state of the battery bank has met the charging mode switch condition.

6. The module as claimed in claim 5, wherein when the voltage value of the battery bank is a fully charged voltage value, the control chip determines that the state of the battery bank meets the charging mode switch condition.

7. The module as claimed in claim 1, wherein when a first voltage difference between the voltage value of the first battery unit and the voltage value of any battery unit of the battery bank is larger than a balance threshold, the control chip enables the balance circuit to adjust a first charging rate of the first battery unit to be less than a second charging rate of a second battery unit among the battery units, wherein the voltage value of the second battery unit is the minimum voltage value among voltage values of the battery units.

8. A battery charging method for a battery bank having serial connected battery units, comprising:
charging the battery bank with a charging current;
detecting voltage values of each battery unit;
when a first voltage value of a first battery unit among the battery units reaches a charge-off voltage value, estimating a first unbalanced voltage;
stopping providing the charging current;
estimating a second unbalanced voltage difference; and
balancing the voltage of the first battery unit and providing the charging current again when the voltage value of the first battery unit is balanced for a calibration target,
wherein the first unbalanced voltage difference is between the first voltage value and a first minimum voltage value among the voltage values of the battery units before the charging transistor is disabled, and wherein the second unbalanced voltage difference is between a second voltage value of the first battery unit and a second minimum voltage value among the voltage values of the battery units after the charging transistor is disabled, and the calibration target relates to the first unbalanced voltage difference and the second unbalanced voltage difference.

9. The method as claimed in claim 8, wherein when the first unbalanced voltage difference exceeds a balance threshold, the step of balancing the voltage of the first battery unit is executed.

10. The method as claimed in claim 8, further comprising:
estimating a voltage difference between the first unbalanced voltage difference and the second unbalanced voltage difference; and
multiplying the voltage difference by a ration, and then adding the second unbalanced voltage difference to generate the calibration target, wherein the ratio is less than 1.

11. The method as claimed in claim 10, wherein the ratio is 0.5.

12. The method as claimed in claim 8, further comprising:
determining whether a state of the battery bank meets a charging mode switch condition after providing the charging current again, and charging the battery bank by a constant voltage when the state of the battery bank meets the charging mode switch condition.

13. The method as claimed in claim 12, wherein when a voltage value of the battery bank is a fully charged voltage value, the control chip determines that the state of the battery bank has met the charging mode switch condition.

14. The method as claimed in claim 8, wherein when a first voltage difference between the voltage value of the first battery unit and the voltage value of any battery unit of the battery bank is larger than a balance threshold, the voltage of the first battery unit is balanced to adjust a first charging rate of the first battery unit to be less than a second charging rate of a second battery unit, and the voltage value of the second battery is the minimum voltage value among voltage values of the battery units of the battery bank.

* * * * *